United States Patent
Tomioka et al.

(10) Patent No.: US 7,255,321 B2
(45) Date of Patent: Aug. 14, 2007

(54) PINCH VALVE

(75) Inventors: Miki Tomioka, Nobeoka (JP);
Toshihiro Hanada, Nobeoka (JP)

(73) Assignee: Asahi Organic Chemicals Industry Co., Ltd., Miyazaki (JP)

( * ) Notice: Subject to any disclaimer, the term of this patent is extended or adjusted under 35 U.S.C. 154(b) by 30 days.

(21) Appl. No.: 10/525,501

(22) PCT Filed: Aug. 20, 2003

(86) PCT No.: PCT/JP03/10525
§ 371 (c)(1),
(2), (4) Date: Sep. 26, 2005

(87) PCT Pub. No.: WO2004/018916
PCT Pub. Date: Mar. 4, 2004

(65) Prior Publication Data
US 2006/0138369 A1    Jun. 29, 2006

(30) Foreign Application Priority Data
Aug. 23, 2002 (JP) .............................. 2002-243930

(51) Int. Cl.
*F16K 7/04* (2006.01)
*F16K 31/00* (2006.01)

(52) U.S. Cl. .................. 251/5; 251/63.5; 251/285; 251/8

(58) Field of Classification Search ............... 251/7, 251/5, 8, 62, 63, 63.5, 284, 285
See application file for complete search history.

(56) References Cited

U.S. PATENT DOCUMENTS 3,350,053 A * 10/1967 Schmitz .................... 251/5
4,895,341 A * 1/1990 Brown et al. .................. 251/8
4,899,783 A * 2/1990 Yusko et al. ................ 137/556
5,823,509 A * 10/1998 Daniels .................... 251/335.2
6,536,738 B2 * 3/2003 Inoue et al. .................... 251/5
6,755,388 B2 * 6/2004 Furukawa et al. ............. 251/5

FOREIGN PATENT DOCUMENTS

| JP | 45-3264 Y1 | 2/1970 |
| JP | 7-103396 A | 4/1995 |
| JP | 2002-372159 1 | 12/2002 |
| WO | 02/46648 A1 | 6/2002 |

* cited by examiner

Primary Examiner—Eric Keasel
Assistant Examiner—John K. Fristoe, Jr.
(74) Attorney, Agent, or Firm—Buchanan Ingersoll & Rooney PC

(57) ABSTRACT

A pinch valve is provided with a main body (10) accommodating a tube body (11), a cylinder body (2) having an upper cylinder portion (17) and a lower handle support portion (3), a piston accommodated in the cylinder portion, a pressing piece (9) fixed to the piston for pressing the tube body, a cylindrical handle (1), a hollow stem (4), and a piston pusher (5, 6). The handle has a female screw portion, and a male screw portion having a pitch larger than the pitch of the female screw portion and adapted to be screwed with the female screw portion formed on the handle support portion. The stem has a male screw portion adapted to be screwed with the female screw portion of the handle on outer periphery, and is accommodated in the cylinder body. The piston pusher is inserted into the stem so that the bottom end surface thereof comes into contact with the top end of the piston and is urged toward the piston by a spring.

12 Claims, 8 Drawing Sheets

PINCH VALVE

TECHNICAL FIELD

The present invention relates to a pinch valve used in a fluid transport pipeline in various industrial fields, such as chemical factories, semiconductor production, food processing, biotechnology or the like, and more particularly, to a pinch valve which has an opening degree adjustment mechanism enabling the opening degree to be adjusted more precisely and easily.

BACKGROUND ART

The applicant invented a pinch valve, improved over the conventional pinch valve, which is extremely compact, enhances the durability of a tube body laid inside during valve opening/closing operations, and enables fine adjustment of the flow rate and filed an application for it previously (Japanese Patent Application No. 2001-179027). Explaining this structure with reference to FIG. 8, it is provided with a cylinder body 52 having a cylinder portion 61 having a female screw portion 60 for adjustment of the opening degree at the top inner periphery thereof and an air port 62 communicating with the bottom end of the cylinder portion 61, a cylindrical handle 54 having at a bottom outer periphery thereof a male screw portion 63 adapted to be screwed with the female screw portion 60 of the cylinder body 52 for adjustment of the opening degree, a disk-shaped spring carrier 55 sandwiching the spring 53 with the top end surface of the recess 64 of the handle 54, a connecting bar 56 engaged with the top of the handle 54 and having a bottom end surface connected with the spring carrier 55 so that the spring 53 is sandwiched between the handle 54 and the spring carrier 55, a piston 57 sliding up and down against the inner pheriphery of the cylinder portion 61 in a sealing manner and having a connecting portion 66 suspended from the center of the piston 57 so as to extend in a sealing manner through a through hole 65 formed in the center of the bottom surface of the cylinder body 52, a pressing piece 58 fixed to the bottom end of the connecting portion 66 of the piston 57, and a tube body 59 comprised of an elastic member held inside the body 51 and pressed against the pressing piece 58.

The operation of this pinch valve will be described below. When the handle 54 is turned in the opening direction in a fully closed state wherein the valve is fully closed as shown in FIG. 8, the bottom end surface of the spring carrier 55 is raised via the connecting bar 56. Along with this, the fluid pressure of the fluid flowing through the inside of the tube body 59 and the elastic force of the tube body 59 cause the pressing piece 58 to be pushed up. As a result, the piston 57 rises and the tube body 59 becomes the intermediate opening degree. On the other hand, when compressed air is supplied from the air port 62 to the first space portion 67 in a state wherein the valve is adjusted to the intermediate opening degree, the pressure of the compressed air causes the piston 57 to start to rise while sliding at its periphery against the inner periphery of the cylinder portion 61. Along with this, the top end of the piston 57 rises while compressing the spring 53 via the spring carrier 55 and the pressing piece 58 rises via the connecting portion 66 suspended from the piston 57. Finally, the top end surface of the pressing piece 58 reaches the top end surface of the oval slit formed at the bottom end surface of the cylinder body 52, whereupon the rise of the piston 57 and the pressing piece 58 stops and the pinch valve becomes the fully opened state.

Further, when the supply of air from the air port 62 to the first space portion 67 is stopped and the valve is opened to the atmosphere in the fully opened state, the piston 57 starts to descend due to the resiliency of the spring via the spring carrier 55 abutting against the spring 53 Along with this, the pressing piece 58 also descends via the connecting portion 66 suspended from the piston 57. Finally, the bottom surface of a flange 68 of the connecting bar 56 reaches the bottom surface of the recess 64 formed at the top of the handle 54, whereupon the descent of the piston 57 and the pressing piece 58 is stopped and the pinch valve is adjusted to an intermediate opening degree. By adjusting the opening degree of the handle 54 in this way, it becomes possible to finely adjust the flow rate.

However, in a pinch valve of the above configuration, the adjustment of the stroke of the pressing piece for adjusting the opening degree of the tube body is proportional to the amount of turning of the handle 54 and the proportional constant of the same is determined by the pitch of the male screw portion of the handle. Therefore, to adjust the stroke more precisely, adjustment by an extremely small angle of rotation is necessary. This results in the large operation error and therefore makes fine adjustment difficult. To enable finer adjustment, it is sufficient to make the pitch of the male screw portion of the handle 1 smaller, but making the pitch smaller causes problems in strength and in processing precision and therefore is limited.

DISCLOSURE OF INVENTION

The present invention has been made in consideration with the above problems of the prior art, and an object thereof is to provide a pinch valve enabling fine adjustment of the opening degree, that is, fine adjustment of the flow rate, in a conventional pitch valve, more precisely and easily.

To achieve the above object, there is provided a pinch valve, which includes a main body formed with a groove for receiving an elastic tube body forming part of a flow passage of a fluid; a cylinder body of a closed-bottom tubular shape fixed to the main body and having a handle support portion provided at an inner periphery thereof with a female screw portion, a cylinder portion arranged below the handle support portion and formed with a through hole in a center of a bottom thereof, and an air port communicating with a bottom end of the cylinder portion at a peripheral side thereof; a piston sliding up and down against an inner periphery of the cylinder portion in a sealing manner and having a connecting portion suspended from a center thereof so as to extend through the through hole of the cylinder portion in a sealing manner; a pressing piece fixed to a bottom end of the connecting portion of the piston so as to press against the tube body when the piston descends; a cylindrical handle having a female screw portion formed on an inner periphery thereof and a male screw portion formed on a bottom outer periphery thereof and having a pitch larger than a pitch of the female screw portion, the male screw portion of the cylindrical handle adapted to be screwed with the female screw portion of the handle support portion; a hollow stem having an annular projection formed at a top inner periphery thereof and a male screw portion formed on an outer periphery thereof so as to be screwed with the female screw portion of the handle, and accommodated in the cylinder body so as to allow the hollow stem to slide up and down and so as to prevent the hollow stem from turning; and a piston pusher having an upper flange formed at a top end thereof and a lower flange formed at a bottom end thereof, the piston pusher inserted in the hollow stem so as to be able to slide up and down with a bottom end surface thereof contacting a top end of the piston, the upper flange engaging with a top surface of the annular projection of the hollow stem so that a spring is supported between the lower flange and a bottom surface of the annular projection of the hollow stem.

The feature of the present invention lies in the point of forming screw portions on the inner periphery and the bottom of the outer periphery of a single cylinder handle and increasing the pitch of the male screw portion formed on the bottom of the outer periphery of the handle from the pitch of the female screw portion formed on the inner periphery of the handle. Due to this, when the handle is turned by one turn, the handle rises or descends by exactly the pitch of the male screw portion with respect to the handle support portion screwed with the male screw portion formed on the outer periphery of the handle and the cylinder body connected to the same, while the hollow stem screwed with the female screw portion of the inner periphery of the handle moves in the reverse direction from the handle by exactly the pitch of the female screw portion with respect to the handle. That is, the hollow stem moves relative to the handle support portion and the cylinder body by exactly the pitch difference between the female screw portion and the male screw portion of the handle due to one turn of the handle, so that the position of the hollow stem can be changed by exactly a fine amount. On the other hand, due to the interaction between the annular projection of the hollow stem, the spring, and the two flanges of the piston pusher, the vertical position of the hollow stem defines the vertical position of the piston pusher and defines the opening degree of the tube body by the pressing piece via the piston. Therefore, according to the structure of the pinch valve of the present invention, fine adjustment of the position of the hollow stem in the vertical direction can be achieved, so that fine adjustment of the opening degree of the tube body (that is, the valve opening degree) can be achieved by the pressing piece via the piston.

Further, since the piston pusher is inserted into the hollow stem so as to be able to slide up and down with a spring placed between the lower flange of the piston pusher and the annular projection of the hollow stem, a supply of air to the cylinder portion through the air port allows the piston pusher to rise with respect to the hollow stem against the force of the spring regardless of the vertical position of the hollow stem with respect to the cylinder body. Accordingly, the pinch valve can be changed by supplying or releasing air to or from the cylinder portion between the intermediate opening degree state and the fully opened state, without any accompanying change of the position of the hollow stem due to turning of the handle.

Preferably, a pitch difference between the female screw portion and the male screw portion of the handle may be set in a range of from $1/20$ to $1/5$ of the pitch of the male screw portion. If the pitch difference is smaller than $1/20$ of the pitch of the male screw portion, the stroke of the handle becomes too large and the valve height becomes larger. Further, if the pitch difference is larger than $1/5$ of the pitch of the male screw portion, fine adjustment of the valve opening degree becomes no longer possible. By selecting the pitch difference between the male screw portion and the female screw portion in the above range, it is possible to adjust the stroke of the handle as desired, so fine adjustment of a broad range of opening degree becomes possible.

Alternatively, preferably, an inner periphery of a portion between the handle support portion and the cylinder portion of the cylinder body is formed with a recess, and the hollow stem has a flange accommodated in the recess of the cylinder body at a bottom end thereof. Accommodating the flange of the hollow stem in the recess of the cylinder body allows the hollow stem to be moved up and down by turning the handle, while preventing it to turn with respect to the cylinder body.

Alternatively, preferably, the pressing piece is accommodated in an oval slit extending in a direction perpendicular to an axis of the flow passage at a bottom end of the cylinder body. By accommodating the pressing piece in the oval slit, rotation of the pressing piece is inhibited.

Alternatively, preferably, connecting portions for connecting the tube body to another tube are provided at the two sides of the main body. These connecting portions make it easy to connect the pinch valve to an outside flow passage.

The material of the tube body of the pinch valve according to the present invention may be EPDM, a fluororubber, silicone rubber, a fluororesin, or a composite of a fluororubber and silicone rubber etc., but is not particularly limited. However, a composite of a fluororesin and silicone rubber may he mentioned as a particularly preferable material.

The material of the handle, cylinder body, handle support portion, hollow stem, and body may be a metal, plastic, or other rigid material, but is not particularly limited. PVC, PVDF, or another fluororesin plastic may be mentioned as a particularly preferable material.

Further, the material of the connecting portion forming the connecting body is not particularly limited so long as it is a plastic or other material having chemical resistance. PTFE, PVDF, PEA, or another fluororesin plastic may be mentioned as a particularly preferable material.

BRIEF DESCRIPTION OF DRAWINGS

These above and other objects, features and advantages of the present invention will be described in more detail below based on the preferred embodiments of the present invention with reference to the accompanying drawings, wherein.

BEST MODE FOR CARRYING OUT THE INVENTION

Although several embodiments of the present invention will be described below with reference to the accompanying drawings, but the present invention is of course not limited to these embodiments.

A pinch valve made of PVDF according to the present invention will be described with reference to the accompanying drawings.

Figure 1:
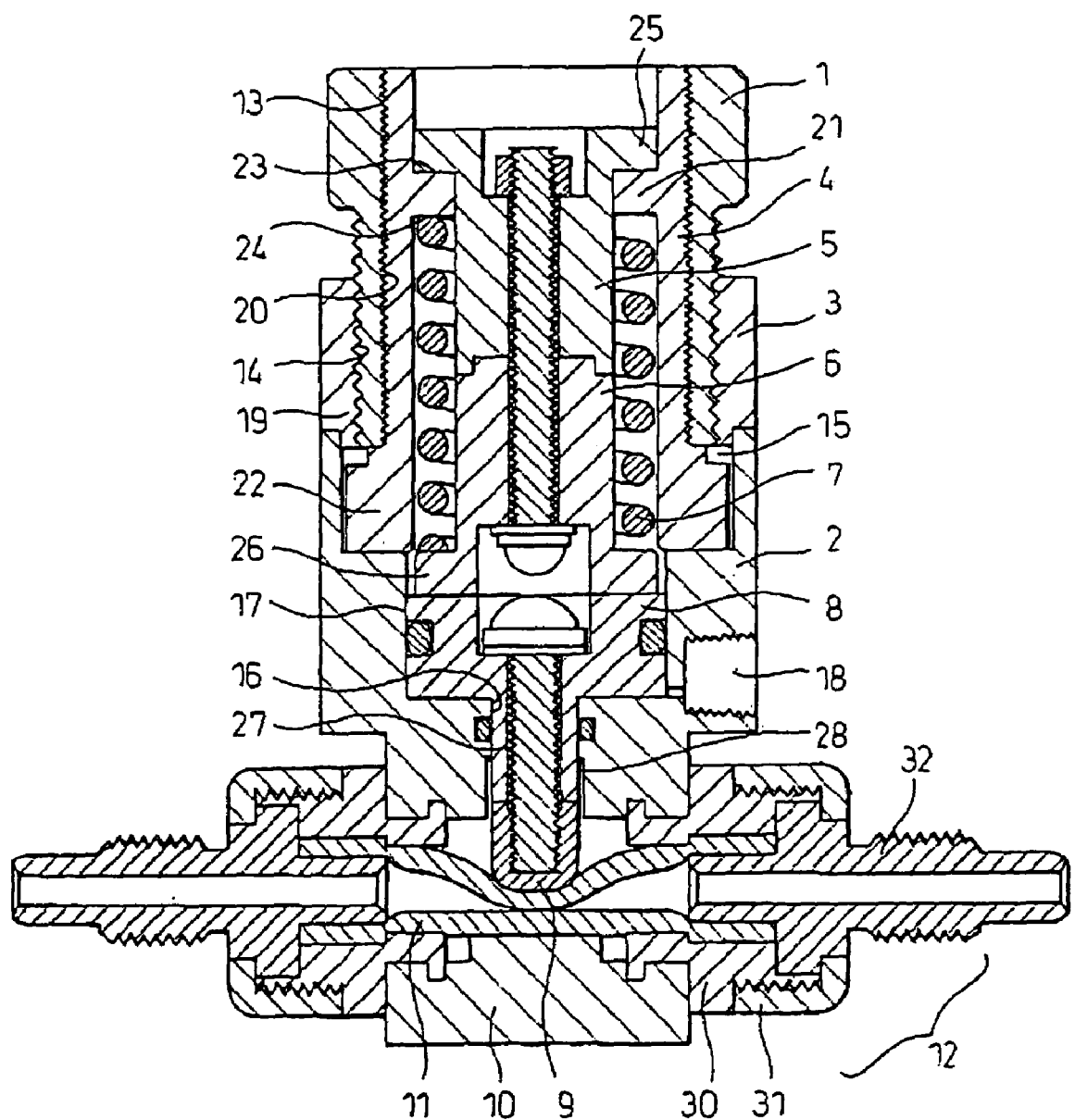
FIG. 1 is a vertical cross-sectional view of a pinch valve in a closed state according to an embodiment of the present invention.
Figure 3:
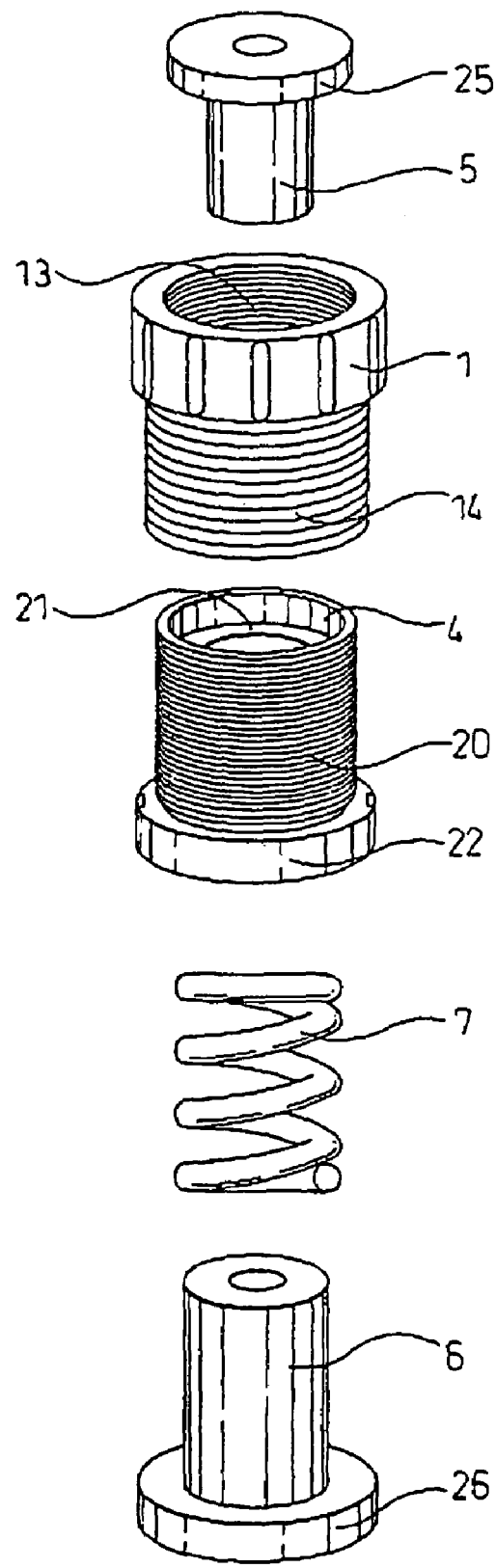
FIG. 3 is an exploded perspective view of a handle, hollow stem, stopper, spring carrier, and spring.

Reference numeral 1 designates a cylindrical handle, which is provided with a female screw portion 13 formed at the inner periphery thereof and provided with a male screw portion 14 formed at the bottom outer periphery thereof by a pitch larger than the pitch of the female screw portion 13 and reduced in diameter from the top end of the handle (see FIGS. 1 and 3).

Reference numeral 2 designates a closed-bottom tube shaped cylinder body, which is provided with a recess 15 formed at the top inner periphery thereof and a cylinder portion 17 formed below the recess 15. The cylinder portion 17 is reduced in diameter from the recess 15 and has a through hole 16 formed at the center of the bottom thereof.

Figure 6:
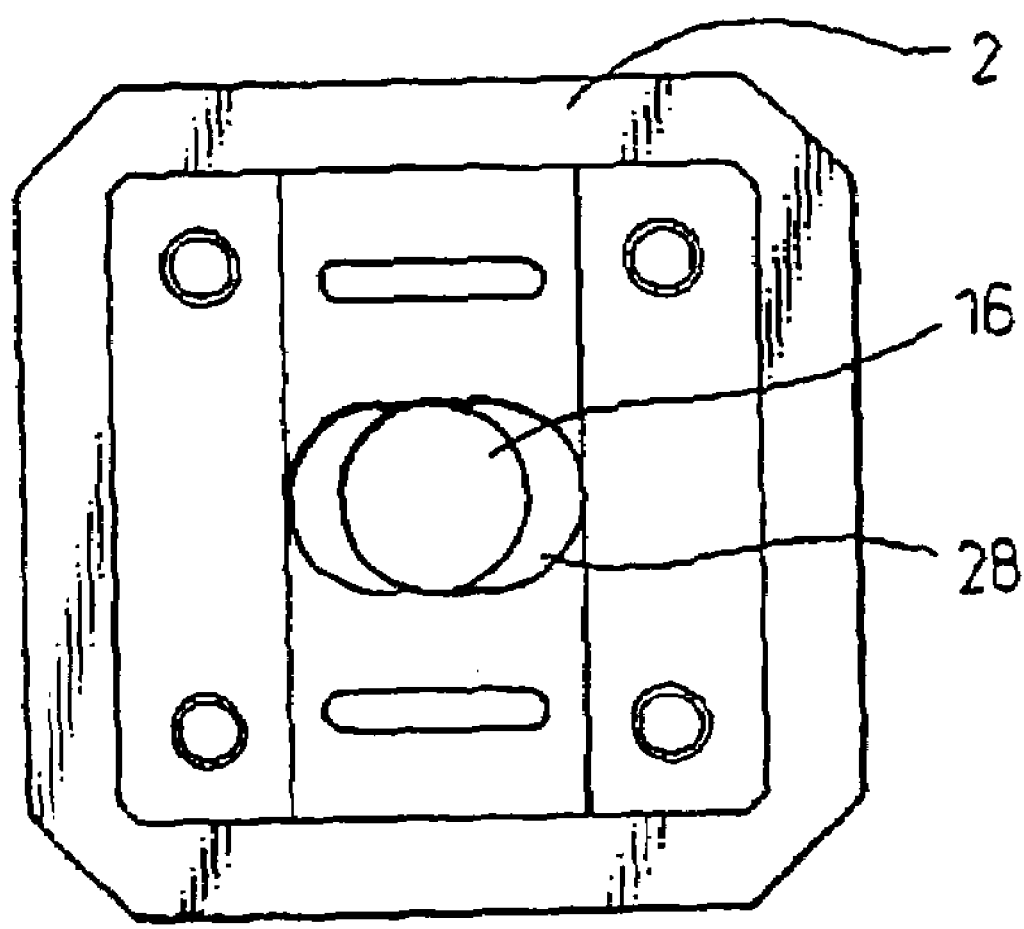
FIG. 6 is a bottom view of a cylinder body shown in FIG. 1.

Further, the bottom side surface of the cylinder body 2 is provided with an air port 18 communicating with the lower part of the cylinder portion 17, wile the center of the bottom end surface is provided with an oval slit 28 centered about the through hole (see FIG. 6).

Reference numeral 3 designates a support for the handle 1, which has a female screw portion 19 formed at the inner periphery thereof and screwed with the male screw portion 14 of the handle 1 and is fixedly joined at the bottom end thereof to the top end of the recess 15 of the cylinder body 2 to form part of the cylinder body 2.

Reference numeral 4 designates a hollow stem, which has a male screw portion 20 formed at the outer periphery thereof and screwed into the female screw portion 13 of the handle 1, an annular protection formed at the top inner periphery thereof, and a flange 22 formed at the side surface of the bottom end and adapted to be accommodated in the recess 15 of the cylinder body 2. Although not shown, the hollow stem 4 is housed in the recess 15 of the cylinder body 2, so that it can move up and down due to turning of the handle 1 while it cannot be turned with respect to the cylinder body 2 (see FIGS. 1 and 3).

Reference numeral 5 designates a cylindrical stopper, which is supported at the inner periphery of the annular projection 21 of the hollow stem 4 and is provided at the top end thereof with a flange 25 adapted to be engaged with the top surface of the annular projection 21, that is, in contact with or separated from it (see FIGS. 1 and 3).

Reference numeral 6 designates a cylindrical spring carrier, which is connected to the bottom end of the stopper 5 and is provided at the side surface of the bottom end with a flange 26 engaged with the top surface of the piston 3 (see FIGS. 1 and 3).

In this embodiment, the stopper 5 and the spring carrier 6 are connected and fixed by a bolt inserted through the two and a nut. However, the fixing method is not limited to this, and the two may be fixed by screwing, welding, etc. as well. The stopper 5 and the spring carrier 6 are connected and fixed in this way to form a single piston pusher.

Reference numeral 7 designates a spring, which is held sandwiched between the top surface of the flange 26 of the spring carrier 6 and the bottom surface of the annular projection 21 of the hollow stem 4 in contact with them. In this embodiment, one spring 7 is attached, but two or more springs 7 may also be attached in accordance with the required urging force.

The piston 8 is of a disk shape, and has an O-ring attached to its outer periphery. Further, the piston 8 has its top end surface in constant contact with the bottom end surface of the spring carrier 6, and is accommodated in the cylinder portion 17 of the cylinder body 2 so as to be able to slide up any down in a sealing manner. The piston 8 is provided at the center bottom thereof with a tubular connecting portion 27 suspended from the same. The connecting portion 27 extends in a sealing manner through a through hole 16 formed in the bottom center of the cylinder body 2. The front end of the connecting portion 27 has a pressing piece 9 fixed thereto. In this embodiment, the pressing piece 9 is fixed by screwing to the front end of the fastening bolt inserted through the connecting portion 27.

The pressing piece 9 is formed into a rod shape overall with the part pressing against the tube body 11 being semicylindrical in cross-section. It is fixed to the connecting portion 27 of the piston 8 so as to perpendicularly intersect the axis of the flow passage and cut across the tube body 11. When the valve is fully opened, it is accommodated in an oval slit 28 which is formed at the bottom end surface of the cylinder body 2 so as to perpendicularly intersect the axis of the flow passage (see FIGS. 4 and 5).

Reference numeral 10 designates a main body connected and fixed to the bottom end surface of the cylindrical body 2 by a nut, bolt, etc. (not shown). The main body 10 is formed with a groove 29 of a rectangular cross-section for accommodating the tube body 11 therein which extends along the axis of the flow passage.

The tube body 11 is comprised of a composite of PTFE and silicone rubber obtained by stacking several layers of sheets of PTFE impregnated with silicone rubber, and forms the flow passage in the main body 10. In this embodiment, the material of the tube body is a composite of PTFE and silicone rubber. However, it may also be EPDM, silicone rubber, a fluororubber, composites of the same, etc. and is not particularly limited.

Reference numeral 12 designates connecting portions made of PTFE, which are formed by connecting body carriers 30 engaging with the groove portion 29 of the main body 10 and the bottom of the cylinder body 2 and fixed to the cylinder body 2 and the main body 10 at the two side surfaces thereof, connecting bodies 32 engaging with the connecting body carriers 30 and connected with the tube body 11, and cap nuts 31 screwed with the outer peripheries of the connecting body carriers 30 for fastening the connecting bodies 32 to the connecting body carriers 30. The structure of the connecting portion 12 is not limited to the present embodiment and may be of any type so long as it is a structure for connecting the tube of the pipeline and the tube body 11.

The operation of the pinch valve of the present embodiment having the above configuration is as follows.

Figure 2:
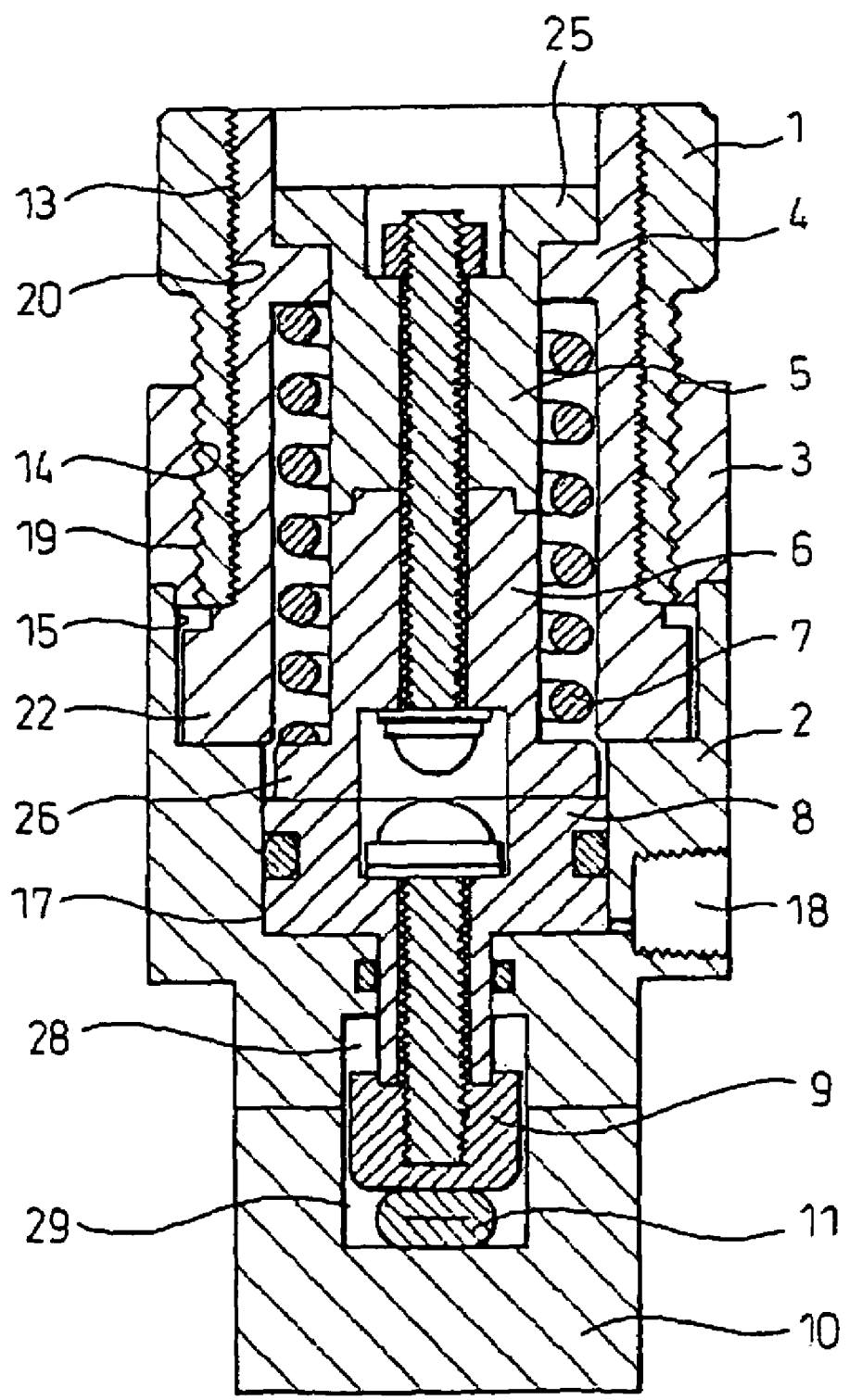
FIG. 2 is a vertical cross-sectional view of the pinch valve of FIG. 1 as seen from the side (in a flow passage direction)

In the state where the pinch valve shown in FIG. 1 and FIG. 2 is fully closed, when compressed air is supplied under pressure into the cylinder portion 17 of the cylinder body 2 from the air port 18, the pressure of the compressed air causes the piston 8 to start to rise while sliding at its outer periphery against the inner periphery of the cylinder 17. Along with this, the top end surface of the piston 8 rises while compressing the spring 7 via the spring carrier 6, and the pressing piece 9 rises via the connecting portion 27 suspended from the piston 8. Finally, the top end of the pressing piece 9 reaches the top end surface of the oval slit 28 formed at the bottom end of the cylinder body 2, whereupon the rise of the piston 8 and the pressing piece 9 is stopped and the tube body 11 becomes the fully opened state (the state shown in FIGS. 4 and 5).

Figure 4:
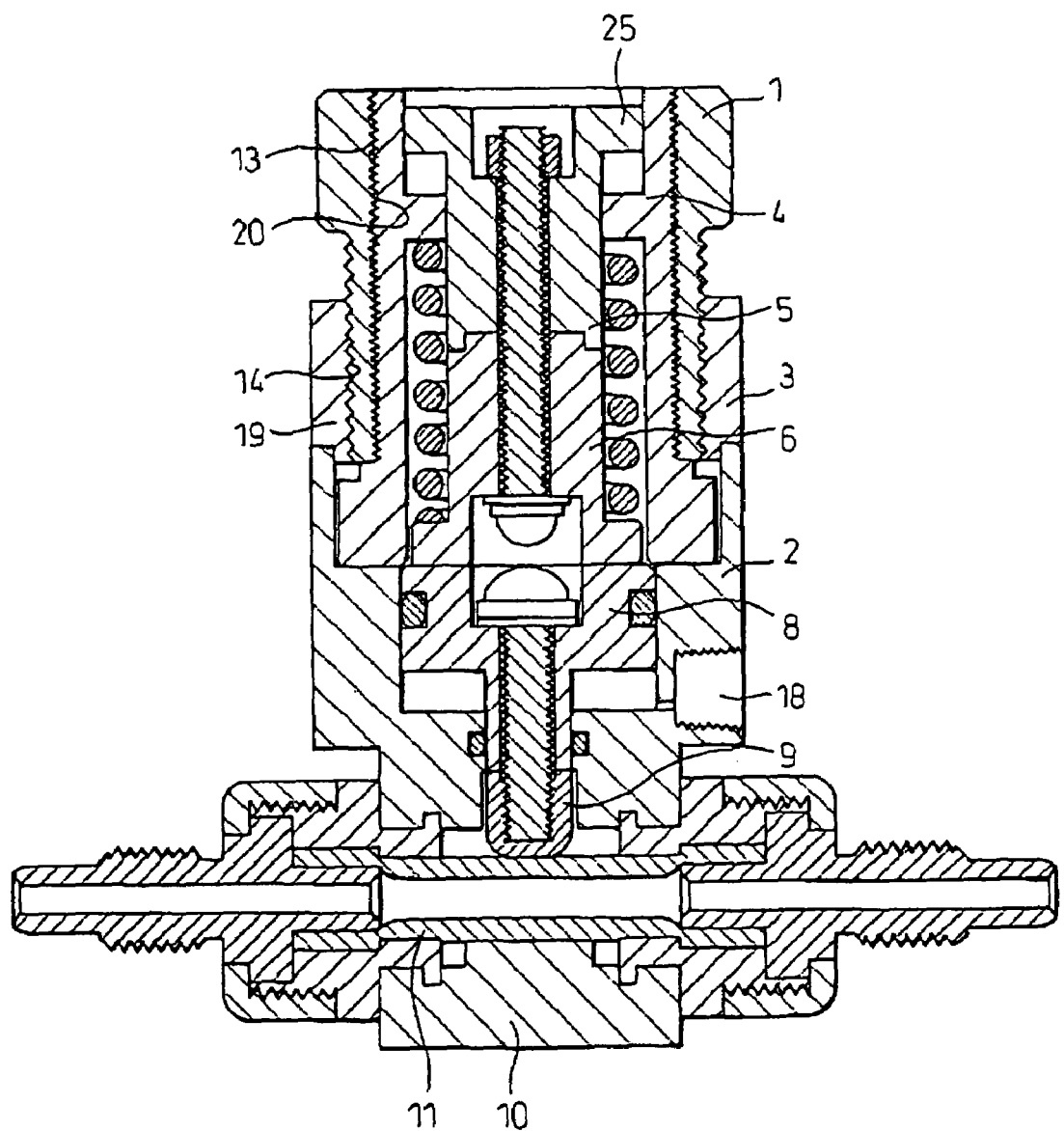
FIG. 4 is a vertical cross-sectional view of the pinch valve of FIG. 1 in an opened state.
Figure 5:
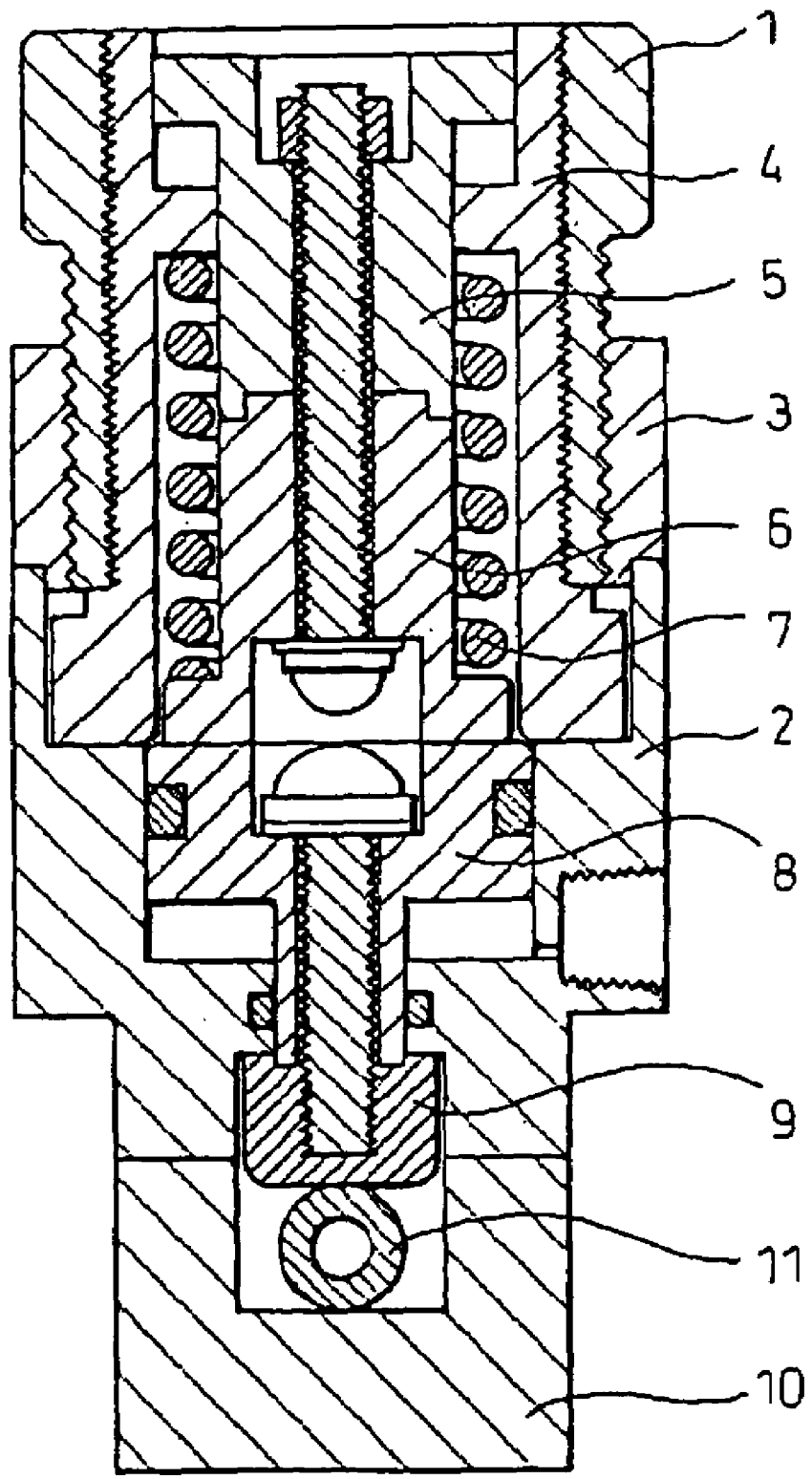
FIG. 5 is a vertical cross-sectional view of the pinch valve of FIG. 4 as seen from the side (in a flow passage direction)

Next, in the state where the pinch valve shown in FIGS. 4 and 5 is fully opened, when the supply of compressed air from the air port 18 to the cylinder portion 17 of the cylinder body 2 is stopped and the air in the cylinder portion 17 is released to the atmosphere, the piston 8 starts to descend due to the resiliency or the spring 7 via the spring carrier 6 abutting against the spring 7 and along with this the pressing piece 9 also descends via the connecting portion 27 suspended from the piston 8. Finally, the bottom end surface of the piston 8 reaches the bottom surface of the cylinder portion 17, whereupon the descent of the piston 8 and the pressing piece 9 is stopped and the tube body 11 becomes the fully closed state (the state shown in FIGS. 1 and 2). At this time, to prevent the pressing piece 9 from turning, the top end surface of the pressing piece 9 is positioned inside the oval slit 28 of the cylinder body 2.

Next, the method of adjusting the pinch valve of the present embodiment to an intermediate opening degree will be described.

Figure 7:
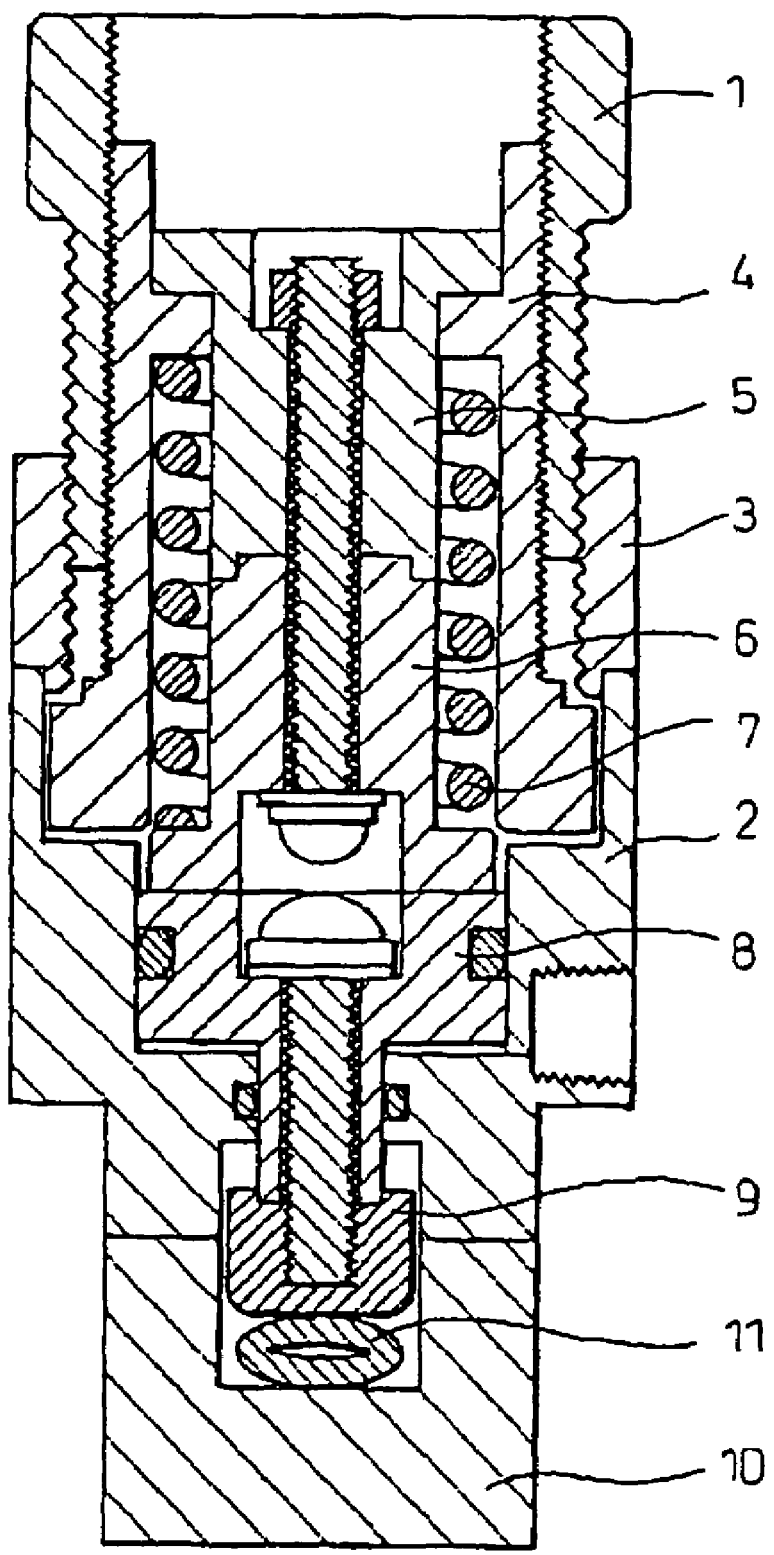
FIG. 7 is a vertical cross-sectional view of the pinch valve of FIG. 1 in an intermediate opening degree state.
Figure 8:
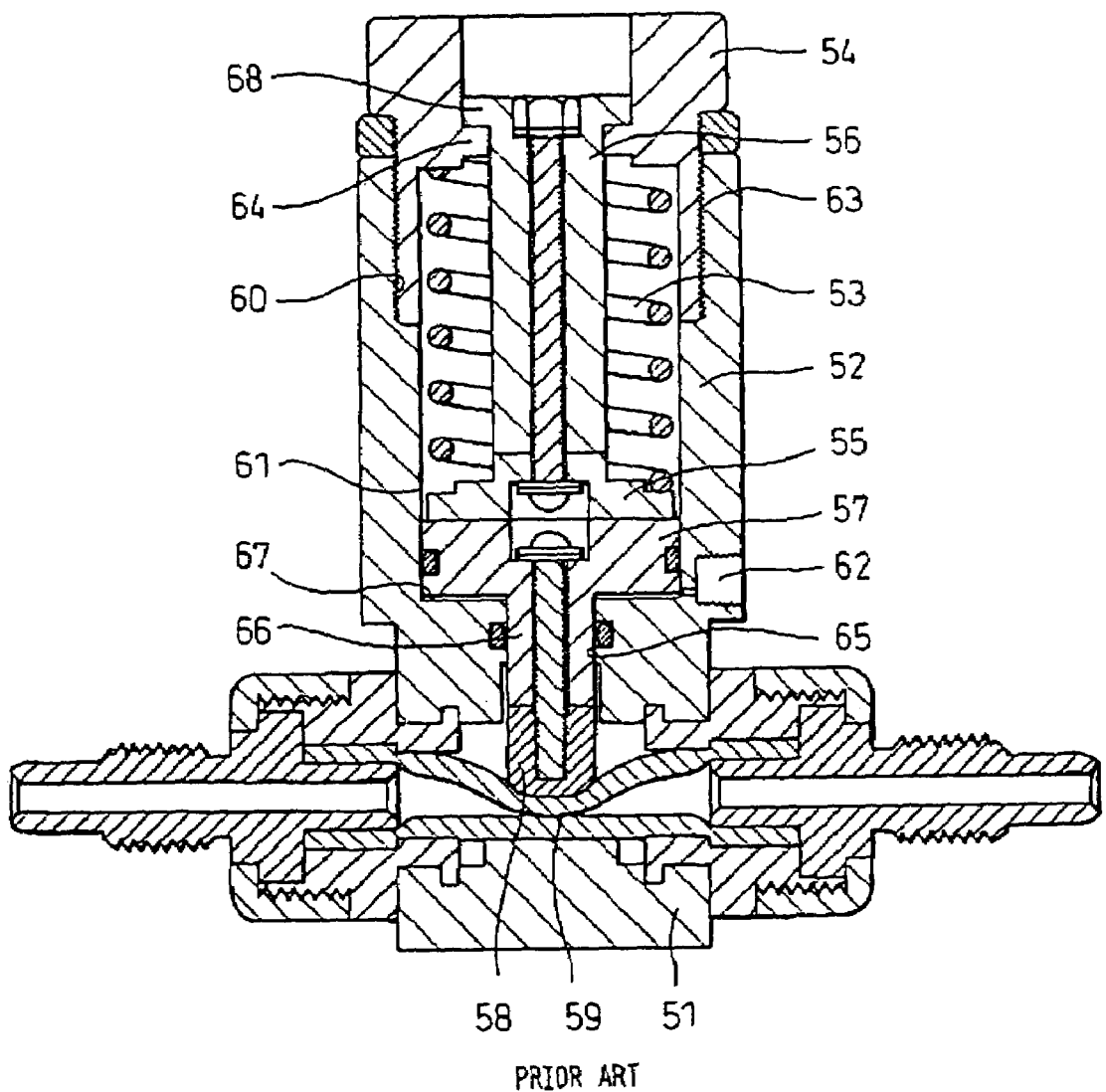
FIG. 8 is a vertical cross-sectional view of the prior art.

In the state shown in FIG. 1, that is, the state where the pinch valve is fully closed, when the handle 1 is turned by exactly one turn in the opening direction, the handle 1 rises by exactly the pitch of the male screw portion 14 formed on the outer periphery of the handle 1. Conversely, the hollow stem 4 screwed into the female screw portion 13 formed on the inner periphery of the handle 1 and having a pitch smaller than that of the male screw portion 14 of the handle 1 descends by exactly the pitch of the female screw portion 13 of the handle 1. Overall, the hollow stem 4 rises by exactly the difference in pitch between the two. For example, when the pitch of the male screw portion 13 formed on the inner periphery of the handle 1 and the female screw portion 20 of the hollow stem 4 are made 1.8 mm and the pitch of the male screw portion 14 formed on the outer periphery of the handle 1 and the female screw portion 19 formed on the inner periphery of the handle support portion 3 are made 2.0 mm, the hollow stem 4 rises 0.2 mm by turning the handle one turn. That is, it rises by exactly $\frac{1}{10}$ of the screw portion pitch of the male screw portion 14 formed on the outer periphery of the handle 1. Along with this, the bottom end surface of the spring carrier 6 is raised via the stopper 5 and the pressing piece 9 is pushed up by fluid pressure of the fluid flowing through the inside of the tube body 11 and the elastic force of the tube body 11. As a result, the piston 8 rises and the tube body 11 is adjusted to an intermediate opening degree (the state shown in FIG. 7).

On the other hand, the transition from the state wherein the pinch valve is adjusted to the intermediate opening degree to the fully opened state or from the fully opened state to the intermediate opening degree state may be performed by supplying air from the air port 18 or releasing the pressurized air in the same manner as described above.

As described above, the pinch valve of the present embodiment can not only start and stop the flow of fluid, but also allow fluid to pass through it at an intermediate opening degree. Therefore, it is possible to use this as a back pressure valve in a closed loop pipeline of a system such as a semiconductor production system.

Since the pinch valve of the present invention has the above structure, using this enables the opening degree to be adjusted more precisely and easily compared with conventional valves and enables the fine adjustment of the flow rate to be performed quickly over a broad range.

While the present invention has been described with reference to specific embodiments shown in the accompanying drawings, these embodiments are for explanatory purposes and are not limitative in any sense. Therefore, the scope of the present invention is only limited by the claims. The preferred embodiments of the present invention can be modified and chanced without departing from the scope of the claims.

The invention claimed is:

1. A pinch valve comprising:
   a main body formed with a groove for receiving an elastic tube body forming part of a flow passage of a fluid;
   a cylinder body of a closed-bottom tubular shape fixed to said main body and having a handle support portion provided on an inner periphery thereof with a female screw portion, a cylinder portion arranged below said handle support portion and formed with a through hole in a center of a bottom thereof, and an air port communicating with a bottom end of said cylinder portion at a peripheral side thereof;
   a piston sliding up and down against an inner periphery of said cylinder portion in a sealing manner and having a connecting portion suspended from a center thereof so as to extend through said through hole of said cylinder portion in a sealing manner;
   a pressing piece fixed to a bottom end of said connecting portion of said piston so as to press against said tube body when said piston descends;
   a cylindrical handle having a female screw portion formed on an inner periphery thereof and a male screw portion formed on a bottom outer periphery thereof and having a pitch larger than a pitch of said female screw portion, said male screw portion of said cylindrical handle adapted to be screwed with said female screw portion of said handle support portion;
   a hollow stem having an annular projection formed at a top inner periphery thereof and a male screw portion formed on an outer periphery thereof so as to be screwed with said female screw portion of said handle, said hollow stem accommodated in said cylinder body so as to allow said hollow stem to slide up and down and so as to prevent said hollow stem from turning; and
   a piston pusher having an upper flange formed at a top end thereof and a lower flange formed at a bottom end thereof, said piston pusher inserted in said hollow stem so as to be able to slide up and down with a bottom end surface thereof contacting a top end surface of said piston, said upper flange engaging with a top surface of said annular projection of said hollow stem so that a spring is supported between said lower flange and a bottom surface of said annular projection of said hollow stem.

2. The pinch valve according to claim 1, wherein a pitch difference between said female screw portion and said male screw portion of said handle is in a range of from $\frac{1}{20}$ to $\frac{1}{5}$ of the pitch of said male screw portion of said handle.

3. The pinch valve according to claim 1, wherein an inner periphery of a portion between said handle support portion and said cylinder portion of said cylinder body is formed with a recess and said hollow stem has a flange accommodated in said recess of said cylinder body at a bottom end thereof.

4. The pinch valve according to claim 3, wherein a pitch difference between said female screw portion and said male screw portion of said handle is in a range of from $\frac{1}{20}$ to $\frac{1}{5}$ of the pitch of said male screen portion of said handle.

5. The pinch valve according to claim 1, wherein said pressing piece is accommodated in an oral slit extending in a direction perpendicular to an axis of said flow passage at a bottom end of said cylinder body.

6. The pinch valve according to claim 5, wherein a pitch difference between said female screw portion and said male screw portion of said handle is in a range of from $\frac{1}{20}$ to $\frac{1}{5}$ of the pitch of said male screw portion of said handle.

7. The pinch valve according to claim 1, wherein connecting portions for connecting said tube body to another tube are provided at the two sides of said main body.

8. The pinch valve according to claim 7, wherein a pitch difference between said female screw portion and said male screw portion of said handle is in a range of from 1/20 to 1/5 of the pitch of said male screw portion of said handle.

9. The pinch valve according to claim 1, wherein a material of said tube body comprises EPDM, a fluororubber, silicon rubber, a fluororesin, or a composite of them.

10. The pinch valve according to claim 9, wherein a pitch difference between said female screw portion and said male screw portion of said handle is in a range of from 1/20 to 1/5 of the pitch of said male screw portion of said handle.

11. The pinch valve according to claim 9, wherein said tube body is comprised of a composite of a fluororesin and silicone rubber.

12. The pinch valve according to claim 11, wherein a pitch difference between said female screw portion and said male screw portion of said handle is in a range of from 1/20 to 1/5 of the pitch of said male screw portion of said handle.

* * * * *